July 16, 1963 E. QUINN 3,097,380
LASTING APPARATUS
Filed May 23, 1962 9 Sheets-Sheet 1

Inventor
Edward Quinn
By his Attorney
Everett D. Littlefield

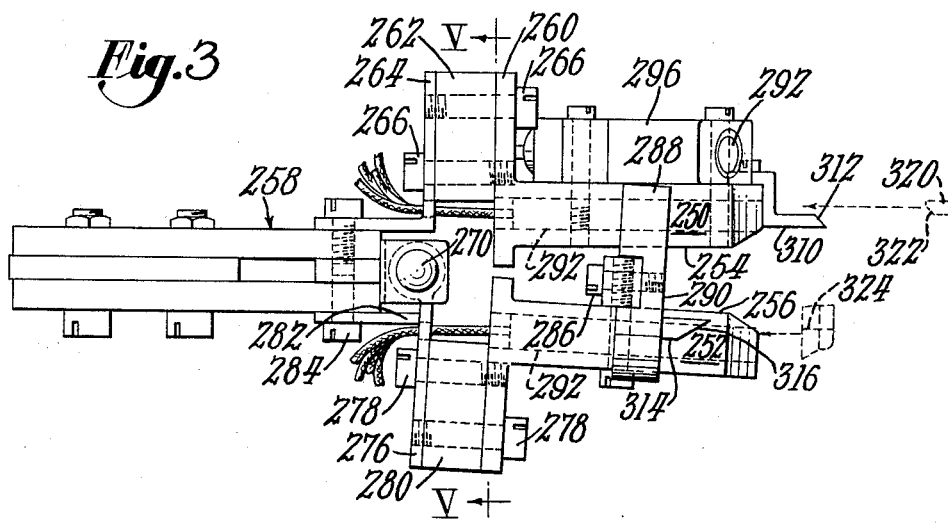
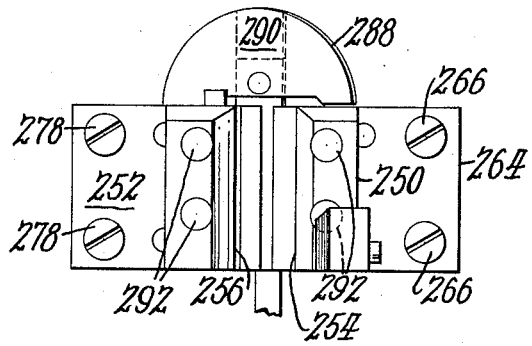
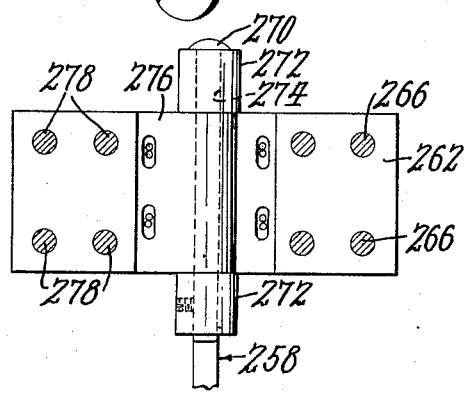
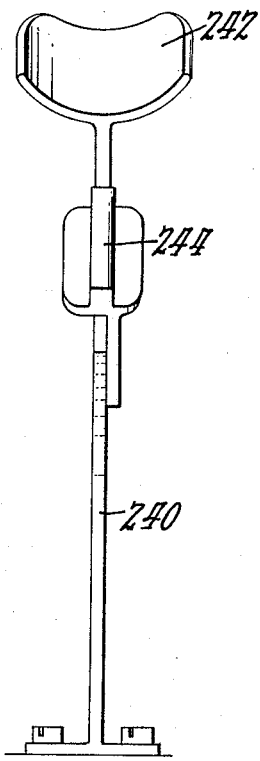

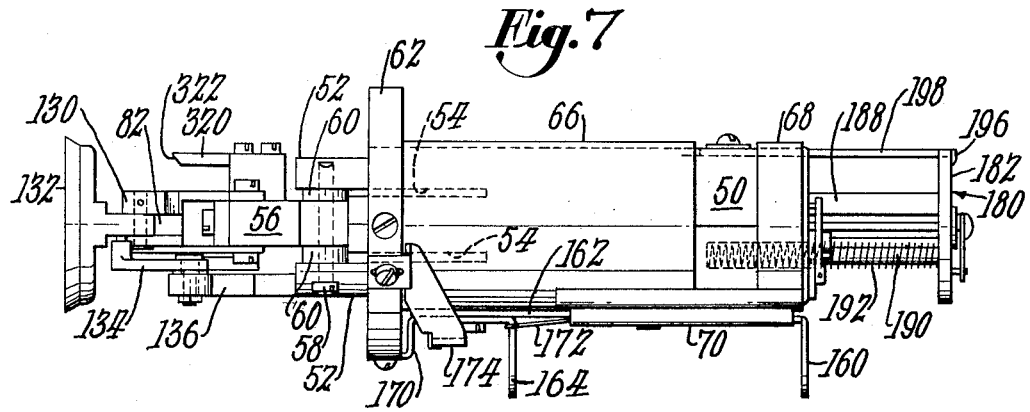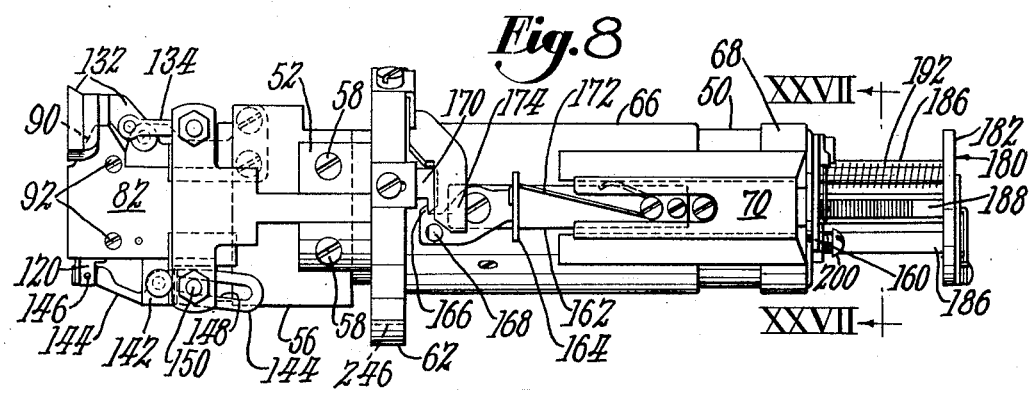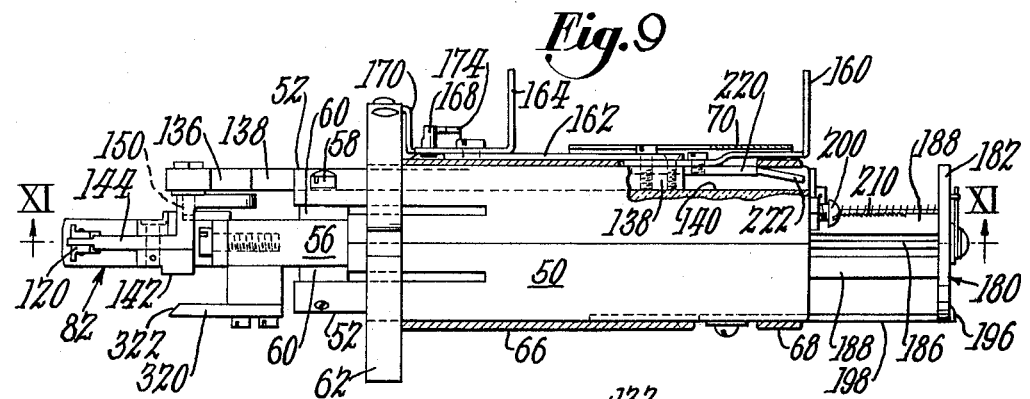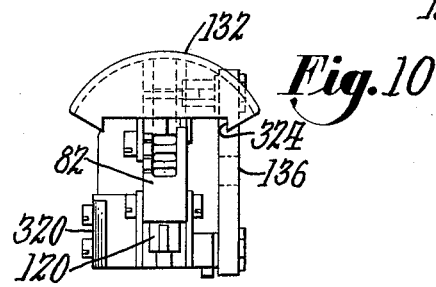

July 16, 1963
E. QUINN
3,097,380
LASTING APPARATUS
Filed May 23, 1962
9 Sheets-Sheet 4
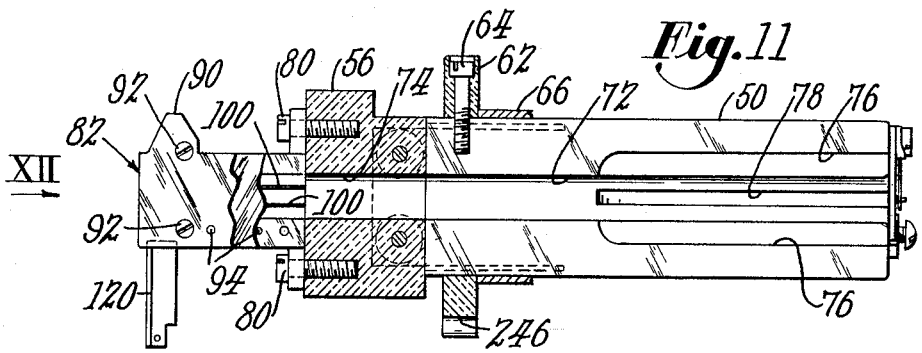
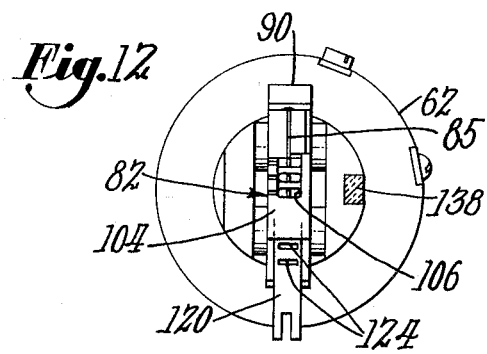
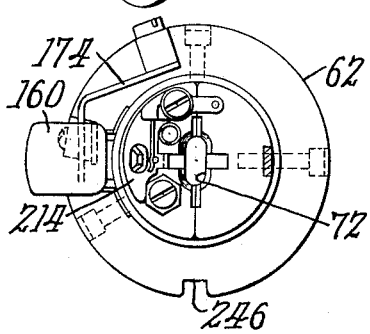
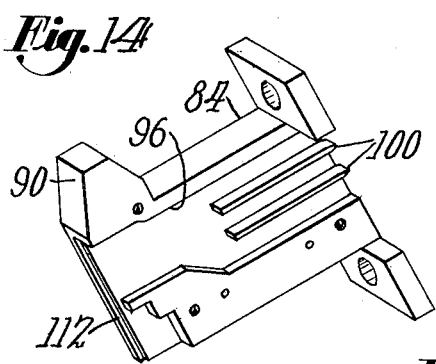
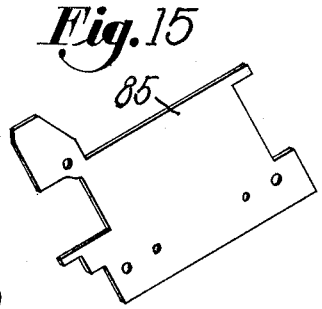
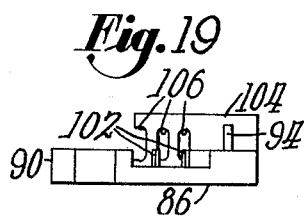
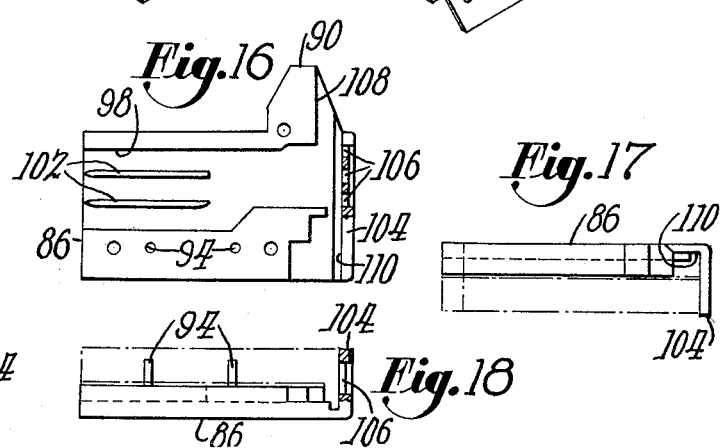
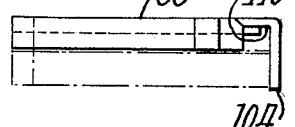

July 16, 1963 E. QUINN 3,097,380
LASTING APPARATUS
Filed May 23, 1962 9 Sheets-Sheet 5

July 16, 1963 E. QUINN 3,097,380
LASTING APPARATUS
Filed May 23, 1962 9 Sheets-Sheet 8
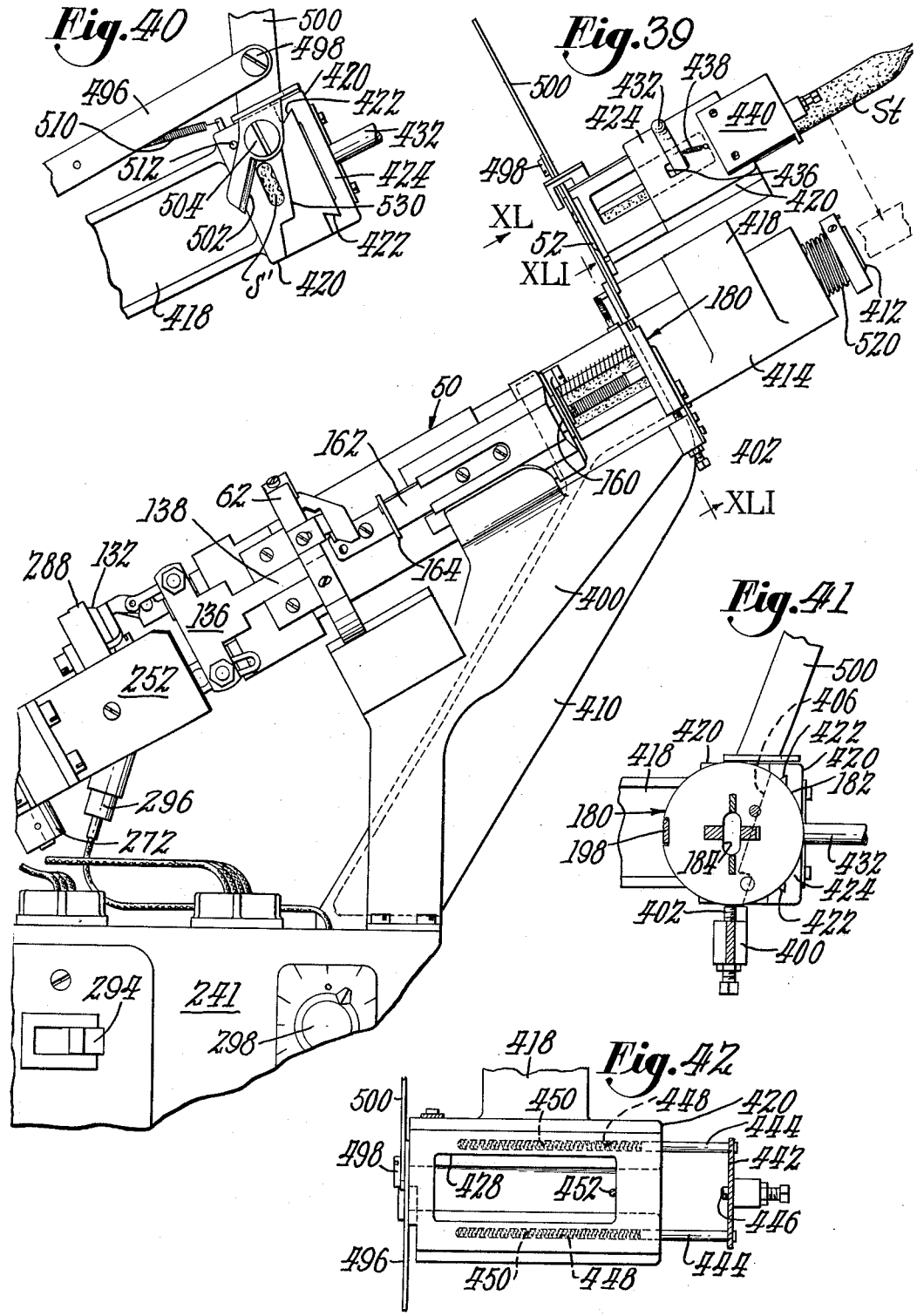

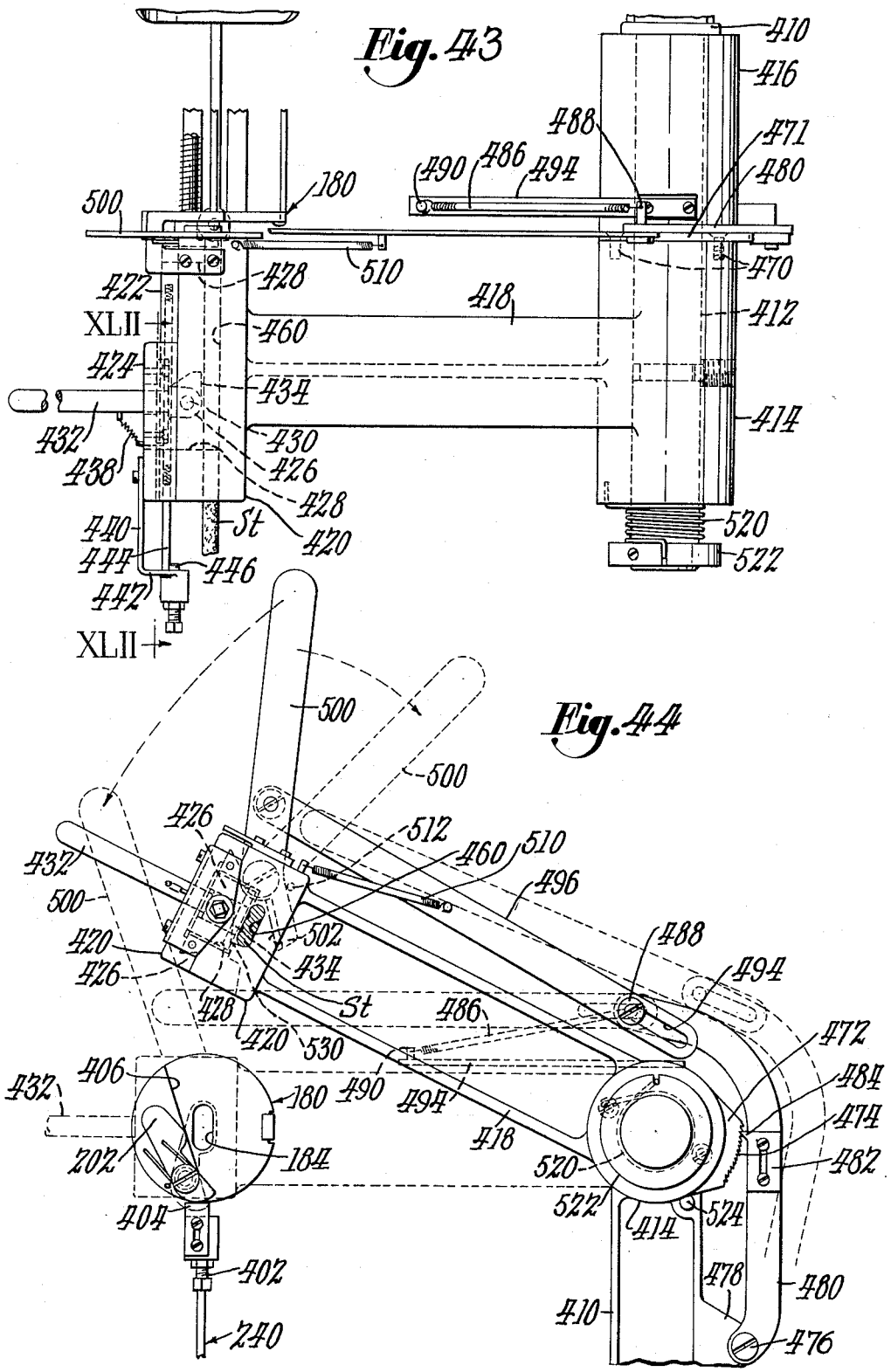

United States Patent Office 3,097,380
Patented July 16, 1963

3,097,380
LASTING APPARATUS
Edward Quinn, Peabody, Mass., assignor to United Shoe Machinery Corporation, Boston, Mass., a corporation of New Jersey
Filed May 23, 1962, Ser. No. 196,993
18 Claims. (Cl. 12—107)

This invention relates to apparatus for use in the lasting of shoes and has for its principal object the provision of novel and improved apparatus for use in first applying molten thermoplastic adhesive, or the like, to the bottom surface of the end portion of the insole of a shoe and to the inner surface of the lasting margin of the upper materials adjacent to said end portion and then in controlling the lasting margin of the upper materials as the margin is wiped inwardly over the bottom of the insole by the wipers of a toe lasting machine.

In lasting the toe ends of shoes, it is now a very common practice to utilize a thermoplastic, or thermosetting adhesive to secure the lasting margin of the upper materials to the toe end of the insole in lasted position, such adhesive being applied in heated molten condition to the bottom surface of the toe end of the insole of the shoe being lasted and also, at least in some instances, to the inner surface of the lasting margin of the upper materials adjacent to the toe end of the shoe. Various types of devices have already been proposed and are in use for thus applying molten adhesive during the toe lasting operation. Immediately after the molten adhesive is applied to the insole, the lasting margin is wiped inwardly over and pressed against the toe end of the insole by the wipers of the toe lasting machine, and during this overwiping operation it is a common practice for the operator to utilize a so-called retarder for holding the lasting margin against the operating edges of the wipers as the wipers are advanced and closed, so that the lasting margin is, in effect, drawn out from between the wipers and the retarder, thus to tension the lasting margin more or less, depending on the pressure exerted by the retarder thereon, and also to cause the lasting margin to be wiped smoothly without wrinkles over the toe end of the insole.

Thus, in accordance with a feature of this invention, the novel and improved lasting apparatus herein illustrated includes a hand-held tool which is provided not only with a nozzle portion through which molten adhesive may be extruded and applied to the bottom surface of the toe end of the insole of a shoe being lasted, but also with a retarder member for use in holding the lasting margin of the upper against the operating edges of the wipers of a toe lasting machine as these wipers are advanced and closed to wipe the lasting margin inwardly over the toe end of the insole. Preferably, the retarder member is mounted for movement between an inoperative position in which it is withdrawn to a remote location out of the way of the extruding nozzle and an operative position adjacent to the nozzle in which it can be conveniently used for the purpose mentioned above and latch means are provided for holding the retarder in each of these two positions. More particularly, the lasting tool is provided with a manually operable feed member by means of which a body of solid adhesive may be fed through a passageway in the nozzle, where it is melted, and then extruded out of discharge apertures provided in the lower work engaging surface of the nozzle for application to the bottom surface of the insole, and through a discharge passage in a nose portion of the nozzle for application to the inner surface of the lasting margin of the upper materials. To avoid operation of this feed member and consequent extrusion of molten adhesive when the retarder is being used, means are provided for locking the feed member and for closing the mentioned discharge apertures and passageway in the nozzle when the retarder is in its operative position, this locking means and the means provided for closing the apertures and passageway being adapted to be released and moved to open position, respectively, when the retarder member is withdrawn to its inoperative position.

In order to facilitate the manipulation of the lasting tool itself by the operator during the toe lasting operation, without the interference of electrical wires attached thereto, the herein illustrated apparatus includes a device for heating the nozzle portion of the tool which is separate from the tool itself. Thus there is provided, in accordance with another feature of the invention, adjacent to a stand for supporting the lasting tool between periods of use, an electrical heating device comprising two oppositely facing heat applying members having heat radiating surfaces adapted to embrace the nozzle portion of the lasting tool when the tool is placed on the stand, and carried by one of these heat applying members is an abutment member having a heat radiating surface adapted to contact the retarder member which is associated with the lasting tool. Preferably, and as herein illustrated, these heat applying members and the tool are provided with cooperating means for causing the nozzle to be snugly embraced by the heat applying members with the retarder bearing against the mentioned abutment member when the tool is supported on the stand.

Further to facilitate the use of the lasting tool by the operator during the lasting operation, there is also associated with the stand on which the tool is supported between periods of use, a device for replenishing the supply of solid thermoplastic adhesive in the tool. As herein illustrated, and in accordance with still another feature of the invention, this device comprises manually operable means for feeding the leading end of an elongated strip of solid adhesive of indefinite length and flexible enough to be stored on a reel, into a bore, within the tool, together with manually operable means for severing that portion of the strip of solid adhesive thus introduced within the tool from the remaining portion of the strip.

The above and other objects and features of the invention will appear in the following detailed description of the preferred embodiment thereof which is illustrated in the accompanying drawings, and will be pointed out in the claims.

In the drawings,

FIG. 3 is a plan view of a portion of the heating device;

FIG. 4 is a view of that portion of the heating device shown in FIG. 3 as seen from the right-hand end of FIG. 3;

FIG. 5 is a view in section substantially on line V—V of FIG. 3 and looking in the direction of the arrows;

FIG. 6 is a view in elevation of a stand associated with the heating device;

FIGS. 7, 8 and 9 are views in elevation of the lasting tool of this invention, FIG. 8 being considered as a side elevation, FIG. 7 as a front elevation looking down on FIG. 8, and FIG. 9 as a rear elevation looking up at FIG. 8 with certain parts omitted, these views being swung around 90° in a clockwise direction from a normal position in order to place them on a single sheet of the drawing;

FIG. 10 is a bottom view of the lasting tool showing only certain parts, but including other parts omitted from FIG. 9;

FIG. 11 is a view of the tool in section substantially on line XI—XI of FIG. 9 and looking in the direction of the arrows;

FIG. 12 is a view of the lasting tool shown in FIG. 11 as viewed from the left-hand end of that figure;

FIG. 13 is a view of the tool shown in FIG. 8 as viewed from the right-hand end of FIG. 8;

FIGS. 14–18 are views, some in perspective and others in elevation, of component parts of a heating and extruding nozzle forming a part of the cement lasting tool;

FIG. 19 is a view of one of the component parts and a portion of a gate member assembled therewith;

FIG. 39 is a view in side elevation of the novel cement lasting tool shown supported in heat receiving relation to a heating device and in operative relation to a device for loading solid thermoplastic adhesive into the tool;

FIG. 40 is a view in side elevation of the aforementioned loading device as seen from the left-hand side thereof; see arrow in FIG. 39;

FIG. 41 is a view in section substantially on line XLI—XLI of FIG. 39 and looking in the direction of the arrows;

FIG. 42 is a view in section substantially on line XLII—XLII of FIG. 43 and looking in the direction of the arrows;

FIG. 43 is a plan view of the loading device; and

FIG. 44 is a view in end elevation of the loading device as seen from the right in FIG. 38.

Figure 27:
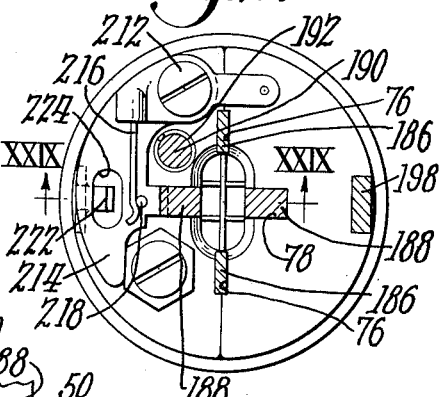
FIG. 27 is a view in section susbtantially on lines XXVII–XXVII of FIG. 8 and looking in the direction of the arrows.
Figure 32:
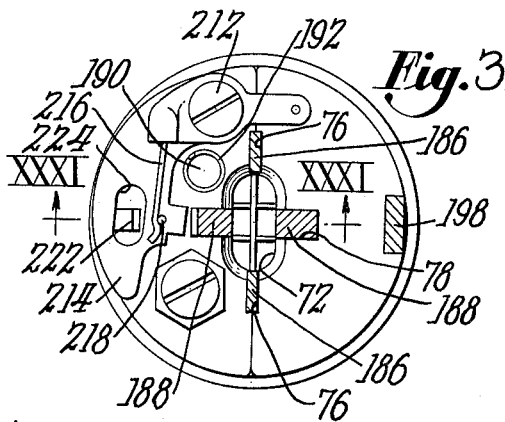
FIG. 32 is a view in section substantially on line XXXII–XXXII of FIG. 30 and looking in the direction of the arrows.

Referring to these drawings, and particularly to FIGS. 7–11 thereof, the novel cement lasting tool therein illustrated comprises a generally cylindrical body portion 50 which is formed of two semi-cylindrical pieces of heat insulating material suitably secured together in face to face relation and shaped to provide two spaced-apart ears 52, 52. Clearance cuts 54, 54 extend from these ears into the body portion, FIG. 7, and a supporting block 56, also formed of heat insulating material, is secured to these ears by means of screws 58, 58, FIG. 8, and insulating spacing washers 60, 60, FIGS. 7 and 9. A cylindrical flange 62 of insulating material is secured to the body portion 50, 50 adjacent to the ears 52, 52, by means of a screw 64, FIG. 11. Surrounding and fastened to the body portion 50 are two metallic sleeve members 66 and 68 which are connected together by a bridge piece 70, FIGS. 7 and 9. Extending lengthwise of the body portion 50 of the tool is a bore 72 which is in alinement with a bore 74 of the same shape and size formed in the supporting block 56, and opening into the bore 72 are four radially extending grooves 76, 76, 78, 78, FIGS. 11, 27 and 32.

Figure 24:
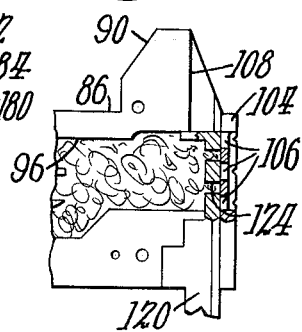
FIG. 24 is a view at an enlarged scale of a portion of the heating and extruding nozzle of the tool, certain component parts of which are omitted in order to show the interior construction.
Figure 25:
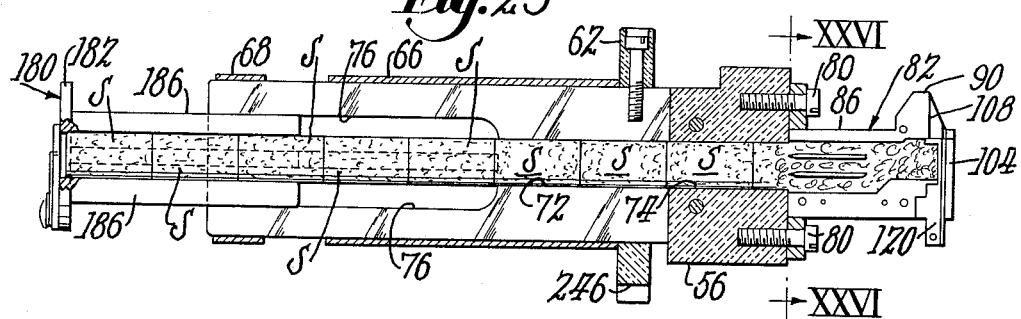
FIG. 25 is a view in side elevation of the tool with certain parts in vertical section and others omitted.
Figure 28:
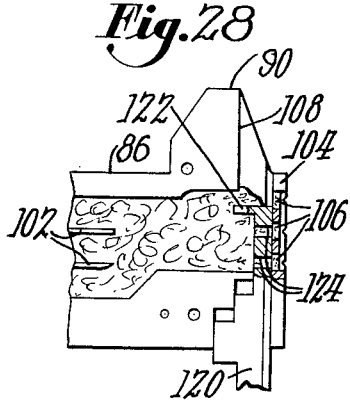
FIG. 28 is a view of a portion of the heating and extruding nozzle similar to FIG. 24 but with a gate member shown in a different position.

Secured to the supporting block 56 by means of screws 80, 80, FIGS. 11 and 25, is a heating and extruding nozzle indicated generally by the reference character 82, FIGS. 7–12, and formed of three component parts 84, 85 and 86, FIGS. 14, 15 and 16–19. These component parts are shaped as shown to provide a nose portion 90 and are held together in assembled relation by means of screws 92, 92 and dowel pins 94, 94. The component parts 84 and 86 are cut away as shown to provide oppositely facing grooves 96, 98 which are interrupted by ribs 100, 102, while the component part 85 is sandwiched in between the parts 84 and 86. A laterally extending flange 104 formed on the component part 86 extends across the lower end of the groove 96 and 98 and is provided with discharge apertures 106, 106, FIGS. 16, 24 and 28. The part 86 is provided with a groove 108 which extends laterally from the groove 98 and out through the nose portion 90. Adjacent to the flange 104, the part 86 is cut away to form a guideway 110, while the part 84 is shaped to provide, together with the flange 104, when the parts are in assembled relation, another guideway 112, and slidably supported within these guideways are the opposite edges of a gate member 120, FIGS. 11, 12, 19, 24 and 28. This gate member is provided with a closure flange 122 at one end and with discharge orifices 124, 124. When the gate member is in the position shown in FIG. 24, the groove 108 which forms a passageway opening out through the nose portion 90 of the nozzle, and three discharge apertures 106, which open out of the lower end of the nozzle, are closed. On the other hand, when the gate member is in the position shown in FIG. 28, the passageway 108 and discharge apertures 106 are opened.

Figure 30:
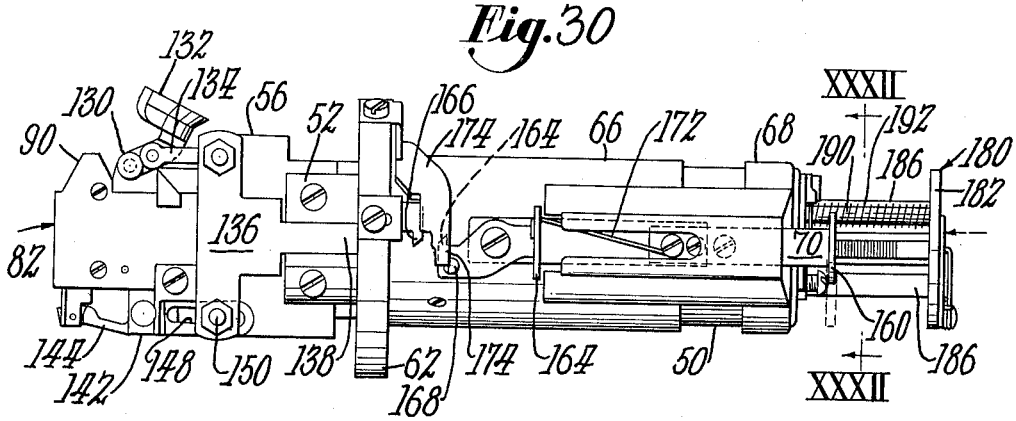
FIG. 30 is a view in side elevation of the novel cement lasting tool similar to that of FIG. 8 but showing certain parts in different operating positions than those shown in FIG. 8.

Secured to the supporting block 56 is a bracket 130 on which there is pivotally mounted a retarder member 132, FIG. 7, shaped as shown in FIG. 10, and see also FIG. 8. This retarder is connected, by means of a link 134, to one end of a cross head 136, formed on a slide 138 which is guided for rectilinear movement in a groove 140, formed in the body portion 50 of the device, FIG. 9. Pivotally mounted on another bracket 142 also secured to the block 56, is an operating lever 144, the lower end of which is connected, by means of a pin 146 to the gate member 120, FIG. 8. Formed in the upper end of the lever 144 is a slot 148 which is angularly disposed with respect to the direction of movement of the slide 138, and projecting into this slot is a pin 150, carried by the opposite end of the aforementioned crosshead 138. With the arrangement just described, when the slide 138 is in the position in which it is shown in FIGS. 7, 8 and 9, the retarder 132 is held in an operative position, see FIGS. 7 and 8, and the gate member 120 is at the same time held in the position shown in FIG. 24, i.e., with passageway 108 and apertures 106 closed. On the other hand, by moving the slide 138 to the right and to the position in which it is shown in FIG. 30, the retarder 132 is withdrawn to an inoperative position, shown in FIG. 30, while the gate member 120 is shifted to the position shown in FIG. 28 in which the passageway 108 and discharge opening 106 are opened.

For actuating the slide 138, there is secured thereto a first thumb piece 160 and a plate 162 on which there is pivotally mounted a second thumb piece 164, FIGS. 7, 8 and 9. The latter thumb piece is adapted to serve also as a latch for holding the slide in each of the two positionse mentioned above by having a hooked end 166 and carrying a flattened pin 168. Thus, the slide is held in a first position, as shown in FIG. 8, by virtue of the engagement of the hooked end 166 with a latch plate 170, such engagement being yieldingly effective by means of a leaf spring 172. Similarly, this slide is held in the position in which it is shown in FIG. 30 by virtue of the engagement of the flattened pin 168 with an abutment plate 174, such engagement being yieldingly effected by the spring 172. The latch plate 170 and the abutment plate 174 are each secured to the peripheral portion of the flange 62 by means of suitable screws. As will be apparent, the slide 138 may be released from either of the two mentioned positions merely by rocking the thumb piece in a clockwise direction against the yieldable resistance of the spring 172.

Figure 26:
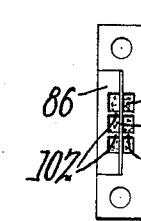
FIG. 26 is a view in section substantially on line XXVI–XXVI of FIG. 25 and looking in the direction of the arrows.

The bores 72 and 74, FIGS. 11 and 25, are adapted to receive a quantity of solid thermoplastic adhesive in the form of a plurality of slugs S or $S_1$, FIGS. 20 and 21, in end to end relation, as shown in FIG. 25, or, alternatively, a single piece of solid thermoplastic adhesive may be fed into these bores in a mannner which will be explained below. When these slugs, or for that matter the solid piece, are fed along, to the right as viewed in FIG. 25, the leading slug will be melted within the heating and extruding nozzle 82, ribs 100, 100, 102, 102, and the intermediate part 85 greatly facilitating this melting action by separating the slugs into six smaller pieces, see FIG. 26, and conducting the heat directly thereto.

Figure 23:
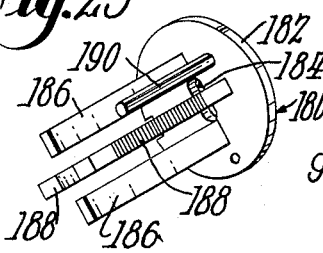
FIG. 23 is a view in perspective of the operating member shown in FIG. 22.

For thus moving the slugs along the bores 72 and 74, a feeding member, indicated generally by the reference character 180, is provided, see FIG. 23. This member comprises an end piece 182 of circular shape provided with a central opening 184 of the same size and shape as the bore 72 and through which slugs S or $S_1$ may be inserted. Secured to and projecting from one side of the end member 182 are four rectangularly shaped guide members 186, 186, 188, 188, and a cylindrical plunger 190. The guide members just mentioned are slidably received within the grooves 76, 76, 78, 78 within the body portion 50, see FIGS. 27 and 32, while the plunger 190, which is surrounded by a compression spring 192, enters a clearance hole formed in the body portion 50. Outward movement of the feeding member, relatively to the body portion 50, i.e., to the right, FIGS. 7-9, or to the left, FIG. 25, under the influence of the expanding spring 192, is limited by the engagement of a stop abutment 196 formed integrally on the end of a strip 198 which is secured to the body portion 50, see FIGS. 7 and 9, while movement of the feeding member in the opposite direction is limited by the engagement of the end piece 182 with a stop screw 200 threaded into and projecting outwardly from one end of the body portion 50.

Figure 22:
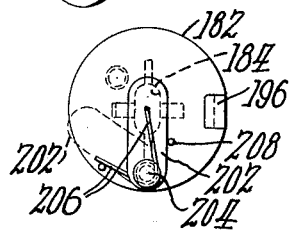
FIG. 22 is a top view of an operating member associated with the cement lasting tool.
Figure 29:
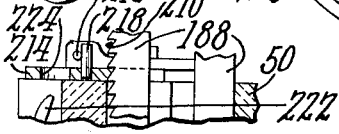
FIG. 29 is a view in section substantially on line XXIX–XXIX of FIG. 27.
Figure 31:
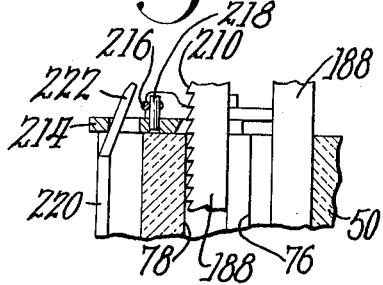
FIG. 31 is a view in section substantially on line XXXI–XXXI of FIG. 32.

In order that the feeding member may perform its intended function, a cover 202 is pivotally mounted on the end piece 182 by means of a pivot pin 204, FIG. 22. A spring 206 is arranged to hold this cover yieldingly in a closed position, as determined by a stop pin 208, while permitting the cover to be swung in a counterclockwise direction to the dotted-line position shown in FIG. 22, thus to uncover the opening 184. With the cover in its closed position, movement of the feeding member to the right, FIG. 25, will propel the slugs S, S along the bores 72, 74 into and through nozzle 82. As will presently appear, such movement of the feeding member 180 is effected by the thumb of an operator as he grasps the tool in his right hand, FIG. 35. Movement of the slugs cannot, of course, occur unless the nozzle 82 is heated, thus to melt the leading slug, and the gate member is moved to the open position shown in FIG. 28 to permit the molten adhesive to be extruded out through the passageway 108 in the nose 90 of the nozzle and also through the apertures 106, 106 which extend through the bottom of the nozzle. Therefore, means are provided for locking the feeding member 180 against operative movement, i.e., movement to the right in FIG. 25, to the left in FIGS. 7, 8, 9 and 30, or downwardly in FIG. 35, when the gate member is in the closed position shown in FIG. 24. For this purpose, one of the guide members 188 is provided with a series of teeth 210, FIGS. 29 and 31, and pivotally mounted on one end of the body portion 50 by means of a screw stud 212 is a latch plate 214, FIGS. 27 and 32. A leaf spring 216, acting on a pin 218 carried by the latch plate, tends to swing the latch plate in a counterclockwise direction, thereby to hold it yieldingly in engagement with the teeth 210 on the guide member 188, FIGS. 27 and 29, when the slide 138 is in the position shown in FIG. 9. As already explained, when the slide is in this position, the gate member is closed and the retarder is in its operative position, see FIGS. 7 and 8.

Secured to the slide 138 is a flat strip 220 having an angularly offset end 222, FIG. 9, and see also FIGS. 27, 29, 31 and 32. This offset end 222 is adapted to project through an opening 224 formed in the latch plate and, when the slide 138 is moved to the position shown in FIG. 30, thus to retract the retarder to its inoperative position and to shift the gate member 120 to open position, to cam the latch plate in a clockwise direction, FIG. 32, away from the teeth 210, thereby releasing the feeding member 180 for actuation to feed the slugs along the bores 72 and 74.

Figure 1:
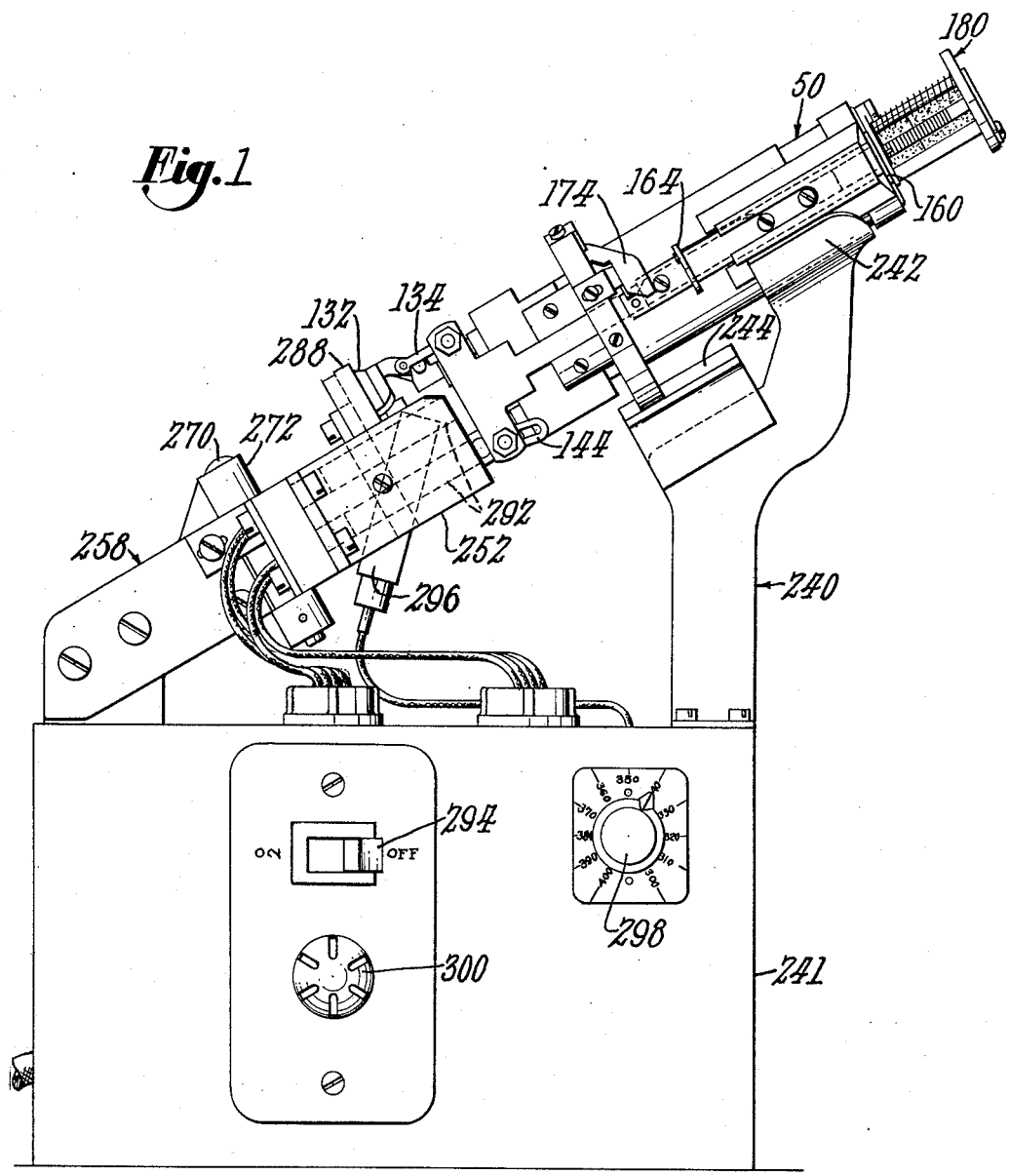
FIG. 1 is a view in side elevation of a cement lasting tool embodying the features of this invention and shown supported in heat receiving relation to a heating device.
Figure 2:
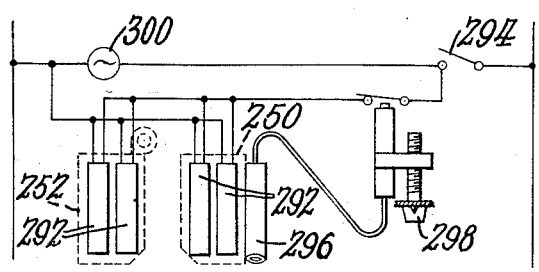
FIG. 2 is an electrical diagram of the circuit associated with the heating device.

During use of the lasting tool, the nozzle 82 thereof must be maintained in heated condition so as to melt the slugs S, S of solid adhesive or solid pieces of adhesive if it is used as they are fed along the bores 72 and 74 into and through the nozzle so that molten adhesive may be delivered out through the passageway 108 and discharge apertures 106, 106. To the end that the weight and size of the tool may be kept at a minimum and to avoid electrical wires connected thereto, thus to facilitate its handling, an external heating device is provided, as is shown in FIG. 1 of the drawings. This device comprises a stand, indicated generally by the reference character 240, which is mounted upon and which extends upwardly from a housing 241 in which certain parts of an electrical heating system, diagrammatically illustrated in FIG. 2, are contained. Formed integrally with the upper end of the mentioned stand is an arcuate saddle 242 on which the cylindrical housing 50 of the lasting tool may rest, while secured to the stand below this saddle is a guiding and supporting rib 244 which is adapted to fit into a notch 246 formed in the flange 62, FIGS. 11 and 25, thus to orient the tool, and particularly the nozzle 82 and retarder 132 with respect to the heating device.

The heating device comprises two heat applying members 250, 252, each provided, respectively, with a heat radiating surface 254, 256. The heat applying member 250 is mounted in fixed relation to a composite supporting bracket, indicated generally by the reference character 258, by means of a flange 260, insulating block 262, angular bracket 264, and screws 266. The heat applying member 252 is pivotally mounted upon the supporting bracket 258 by means of a hinge pin 270 which passes through ears 272, 272 associated with the bracket, and a bore 274, formed in the enlarged edge of a plate 276 to which the member 252 is secured by means of screws 278, 278, FIGS. 3, 4 and 5. Because of its inclined position, FIG. 1, the force of gravity tends to swing the heat applying member 252 away from the member 250 and into the position shown in FIG. 3, as determined by a stop 282 secured to the bracket 258 by a screw 284. Secured to an upstanding post 286 mounted on the member 252 is a semi-circular abutment member 288 having a flat heat radiating surface 290.

Electrical heating elements 292, 292, 292, 292 are received within bores formed in the heat applying members, and these elements are connected by suitable leads into an electrical circuit, diagrammatically illustrated in FIG. 2 and including an off-on switch 294, a thermostat 296 with adjusting knob 298, and a signal light 300, see also FIG. 1. The thermostat 296 is mounted on the heat applying member 250, FIG. 3.

Secured to the heat applying member 250 is a guide member 310 formed with an angular cam surface 312 and another guide member 314, provided with a similar cam surface 316 is formed integrally with the abutment member 288, see FIG. 3. Mounted on the supporting block 56 of the tool is a guide member 320 provided with a cam surface 322, FIG. 7, which is complemental to the surface 312 on the guide member 310. Also, the retarder 132 is cut away as shown best in FIG. 10 to provide a shoulder 324, see also FIG. 3. Thus, after use, the tool is placed on the support 240 with its body portion resting on the saddle 242, and then is slid downwardly and to the right, toward the position shown in FIG. 1, so that the surfaces 322 and shoulder 324 will engage the cam surfaces 312 and 316 and cause the nozzle 82 to be snugly embraced by the heat applying members 250, 252 with the heat radiating surfaces 254, 254 engaging the sides of the nozzle and with the lower surface of the retarder 132 in heat receiving contact with the heat radiating surface 290 of the abutment 288. The tool remains in this position during the completion of the toe lasting operation on the shoe then being lasted, as well as the initial stage of the toe lasting operation performed on the next succeeding shoe, whereupon it is taken by the operator and used first to spread molten adhesive on the toe end of the insole and adjacent inner surface of the lasting margin of the upper and next to cooperate with the wipers as a retarder while the lasting margin is being wiped inwardly over and pressed against the insole by the wipers of the toe lasting machine.

Figure 33:
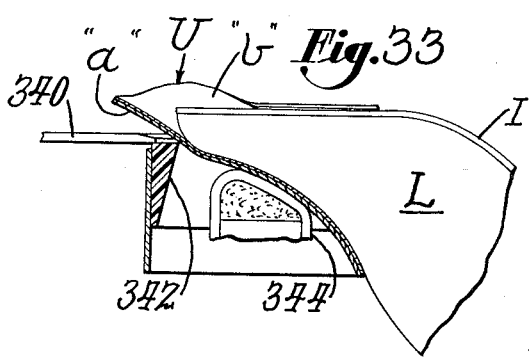
FIGS. 33 and 34 are views showing the toe end of a shoe being lasted in a toe lasting machine with the lasting elements shown in different positions assumed during the toe lasting operation.
Figure 34:
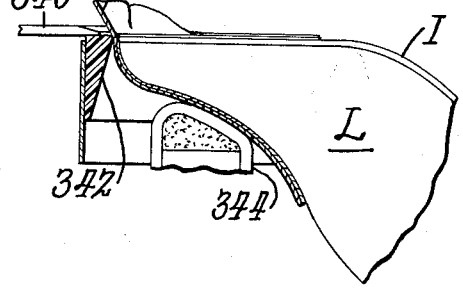
Figure 35:
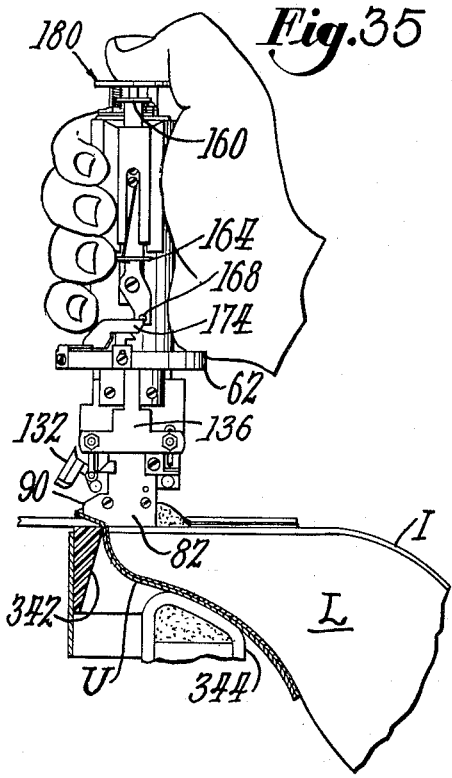
FIGS. 35 and 36 are two views, the first in side elevation and the other in plan, illustrating how the cement lasting tool is used to apply lasting adhesive.
Figure 36:
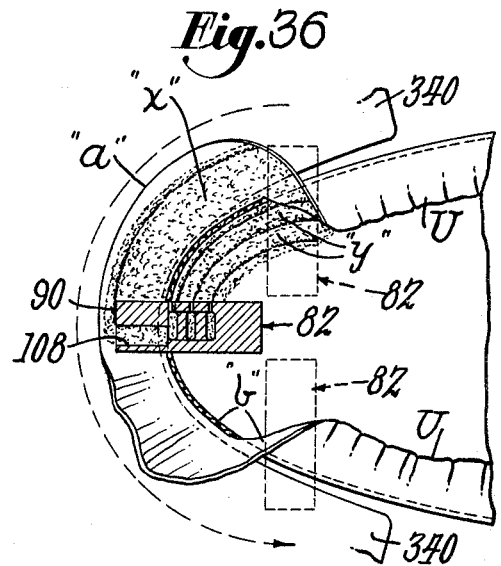
Figure 37:
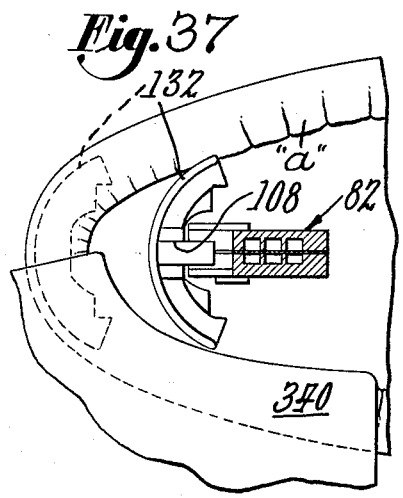
FIGS. 37 and 38 are two views, the first in plan and the other in side elevation, illustrating how the cement lasting tool is used to facilitate the toe lasting operation after the application of adhesive.
Figure 38:
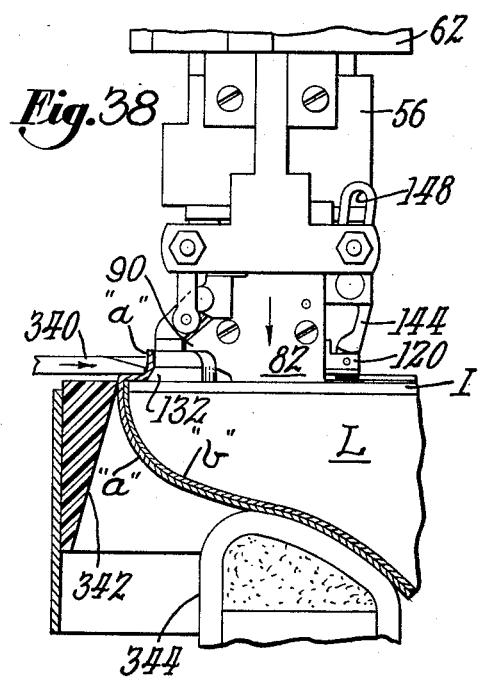

Referring to FIGS. 33–37, the manner in which the tool is used for the purpose just briefly mentioned will be explained in somewhat more detail. FIGS. 33, 34, 35 and 38 each show the operating elements of a toe lasting machine of a well-known type, such, for example, as is disclosed in United States Letters Patent No. 2,990,559, granted July 4, 1961 in the name of Andrew J. Gilbride, and including toe lasting wipers 340, 340, a toe band 342 shown in different positions assumed during the lasting of the toe end of a shoe therein illustrated as comprising upper materials, indicated generally by the reference character U, but comprising an outer layer of leather or the like $a$ and an inner lining $b$, and insole I assembled on a last L, the shoe being supported on a toe pad 344 against which it is clamped by the usual heel engaging means, not shown. In lasting the toe end of the shoe, the upper materials U are first shaped to the toe end of the last L as a result of the upward movement of the toe band 342, while held yieldingly in engagement with the upper materials, as shown in FIGS. 33 and 34. This upward movement of the toe band, which is also imparted to the toe wipers, is arrested when the parts reach the positions shown in FIG. 34 with the wipers substantially in the same plane as the bottom of the insole I. With the toe band still holding the upper materials, the operator spreads the lasting margin thereof outwardly over the top surfaces of the wipers and, by means of a hand knife, trims out a portion of the lining "$b$" around the toe end of the shoe, as shown in FIGS. 34 and 36. Next, the operator takes the tool from the stand and heating device shown in FIG. 1, and after elevating the slide 138 and crosshead 136 to retract the retarder member 132 to inoperative position, to move the gate member 120 to open position and to release the feeding member 180, he swings the nozzle 82 from the uppermost position shown in broken lines in FIG. 36 to the lowermost position shown in broken lines on that figure, while at the same time pushing downwardly on the feeding member 180 with his thumb, as shown in FIG. 35, thereby extruding molten adhesive out through the passageway 108 in the nose portion 90, to spread a band "$x$" of adhesive on the inner surface of the outermost layer "$a$" of the upper materials and out through the apertures 106, 106 in the bottom of the nozzle, to spread closely spaced bands "$y$" of molten adhesive around the toe end of the insole, FIG. 36. Immediately after the molten adhesive has thus been applied to the upper and insole, the tool is elevated and the slide 134 and crosshead 136 are moved downwardly and latched in their lowermost position, thus to return the retarder 132 to its operative position, to shift the gate member 120 to closed position and to lock the feeding member 180 against operation. Now, the retarder is placed on the toe end of the insole and used in the usual manner to retard the inward folding movements of the lasting margin of the upper by the wipers as the wipers are advanced and closed to wipe the lasting margin inwardly over the insole. At the conclusion of this lasting operation, the tool is returned to the heating device for reheating of the nozzle in the manner explained above.

Figure 20:
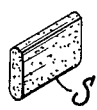
FIGS. 20 and 21 are views in perspective of two pieces of adhesive suitable for use in the cement lasting tool.
Figure 21:
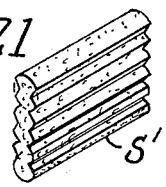

The lasting tool which has been described above may, as has already been suggested, be charged with solid thermoplastic adhesive in the form of slugs S or $S_1$, FIGS. 20 and 21, or as a single piece of solid adhesive of indefinite length. When slugs S or $S_1$ are used, they may conveniently be inserted, as needed, into the tool through the opening 184 in the end member 182 of the feeding member 180, when the cover 202 is swung aside and into the dotted-line position shown in FIG. 22. As will be apparent in FIG. 25, the stroke of the feeding member is slightly longer than the length of a single slug. Thus, when the feeding member 180 has been moved to the right, from the position shown in FIG. 25, as far as it will go, a quantity of molten adhesive equal in volume, the volume of about one and a half of a slug, will have been extruded through the nozzle 82. This is enough adhesive to take care of a number of shoes, and, when the full stroke of the feeding member has been reached, the operator merely permits the feeding member to be returned to the position shown in FIG. 25 by the spring 192, opens the cover 202, and inserts another slug, this operation taking only a very short time.

On the other hand, if desired, the adhesive may be supplied in the form of a solid, elongated strip $S_t$, FIG. 39, which is flexible enough to be stored upon a reel, not shown. In this case, the solid strips of adhesive may be fed into the tool by means of the feeding mechanism shown in FIGS. 39 to 43 of the drawings. Referring first to FIG. 39, the stand 240 is extended, as indicated at 400, and is shaped to provide a boss through which an abutment screw 402 is threaded. Adjustably secured to this boss is an abutment member 404 which is adapted to engage the lower portion of the cover 202 on the feeding member 180 of the tool and to swing the cover to open position when the tool is placed on the stand, see FIG. 44. Also, the end member 182 of the feeding member 180 is slightly modified to provide an angularly disposed shoulder 406, for a purpose that will presently appear.

Mounted upon and extending upwardly from the housing 241 is a supporting arm 410, FIG. 39, carrying at its upper end a fixed shaft 412 on which a hub 414 is journaled and on which a spacing sleeve 416 is fixed. Formed integrally with the hub 414 and extending radially therefrom is an arm 418 having a generally rectangularly shaped outer end portion 420, FIG. 43. Slidably mounted on dovetail guides 422, 422, FIG. 40, formed on the mentioned end portion is a feed block 424, FIGS. 39, 40 and 41, this block having a pair of spaced ears 426, FIG. 43, extending into a slot 428 in the end portion 420, FIGS. 42 and 43. Pivotally mounted on these ears by means of a pin 430 is an operating lever 432 carrying at its lower end a feed dog 434. The lever 432 is normally held yieldingly against one end of a clearance opening 436, formed in the block 424, by means of a coil spring 438, FIG. 39. Secured to the block 424 is a plate 440 having an integrally formed flange 442, FIG. 43, on which there are mounted two push rods 444, 444 and an adjustable stop screw 46, FIG. 42. The push rods extend into bores 448, 448 in the end portion 420 and engage compression springs 450, 450 which yieldingly urge the feed block 424 downwardly, FIG. 43, and to the right, FIGS. 39 and 42, to the extent determined by the engagement of a pin 452 carried by the feed block 424 against one end of the slot 428. As will be apparent, movement of the feed block 424 in the opposite direction by means of the operating lever 432 will be limited by the engagement of the stop screw 446 with the end portion 420.

Extending through the end portion 420 and opening into the slot 428 is a groove 460, FIG. 43, which is adapted to receive the leading end of a solid rod or strip of adhesive St, the remaining portions of the strip being conveniently stored on a reel, not shown. As will be understood, with the leading end of the strip St inserted into the groove 460, the strip will be fed along the groove by the feed dog 434 as the feed block 424 is moved upwardly, FIG. 43, or to the left in FIG. 39, by means of the operating lever 432.

Secured to one end of the hub portion 414 by means of screws 470, 470, and located between the hub and the sleeve 416, FIG. 43, is a plate 471 having an arcuate portion 472 which projects beyond the hub and sleeve and is provided with a series of ratchet teeth 474, FIG. 44. Pivotally mounted on a screw stud 476 threaded into a projection 478, formed on the supporting arm 410, is a curved lever arm 480, shaped as shown in FIG. 44, to which there is secured a plate 482 having a single tooth 484 for engaging the ratchet teeth 474. A coil spring 486, stretched between a headed stud 488 carried by one end of the lever arm 480 and a pin 490, carried by a supporting strip 494, secured to the sleeve 416, tends to swing the lever arm 480 in a counterclockwise direction, FIG. 44, so as to hold the tooth 484 yieldingly in engagement with the teeth 474.

Connected at one end of the lever arm 480 by means of the headed stud 488, previously referred to, and an elongated slot 494 in one of its ends, is a link 496. The other end of this link is connected, by means of a screw stud 498, to the operating arm 500 of a knife 502 which is pivotally mounted by means of a screw stud 504 on one end of the enlarged end portion 420 of the arm 418. A coil spring 510 tends to urge the link 496 to the left, FIG. 44, thus to hold the operating arm 500 of the knife yieldingly in the position shown, and as determined by the engagement of the back edge of the knife 502 with a stop pin 512, FIG. 40. A torsion spring 520, anchored at one end on a collar 522, secured to the shaft 412, and at its other end to the hub 414, tends to hold the arm 418, together with the other parts which are carried thereby, yieldingly in the position shown in FIG. 44 and as determined by the engagement of a portion of the plate 472 with a stop pin 524.

In using the feeding device which has just been described, the operator takes hold of the operating lever 500 and swings the arm 418 downwardly in a counterclockwise direction, against the resistance of the torsion spring 520, to the dotted-line position shown in FIG. 44, in which position an abutment surface 530 formed on the end portion 420 of the arm 418 engages the shoulder 406 on the end member 182 of the feeding member 180, thereby alining the strip of solid adhesive St in the groove 460 with the opening 184 in the end member 182. The arm 418 and associated parts are held in this dotted-line position as the result of the engagement of the tooth 484 with the ratchet teeth 474. Next, the operator grasps the operating lever 432 and moves it upwardly, FIG. 43, to the left, FIG. 39, thus to feed the leading end of the solid strip of adhesive St through opening 184, which is now exposed as cover 262 is swung to open position by abutment 404, into the tool until this leading end of the strip engages the trailing end of the strip previously fed into the tool. Upon release of the lever 432, the feed block 424, together with the lever, are returned to the position shown in FIG. 43. Now, the operator seizes the arm 500 and swings it in a clockwise direction, FIG. 44, thereby severing the leading end of the strip which is now inside of the tool from the remaining portion of the strip, see dotted-line position in FIG. 44. At the completion of this strip severing movement of the arm 500, the left-hand end of the slot 494 in the link 496 will strike the stud 488 and swing the arm 480 in a clockwise direction, thereby disengaging the tooth 484 from the teeth 474, whereupon the parts are returned to the solid-line positions shown in FIG. 44 by the spring 420, when the operator lets go of the arm 500.

Having described my invention what I claim as new and desire to secure by Letters Patent of the United States is:

1. A tool for use in lasting shoes comprising a body portion adapted to be grasped by one hand of an operator, a nozzle portion carried by the body portion, a feed member mounted on the body portion for movement by the operator to extrude adhesive through said nozzle portion onto the shoe being lasted, and a retarder member mounted on said body portion for movement by the operator to and from an operative position adjacent to the nozzle portion and an inoperative position away from said nozzle portion.

2. A tool for use in lasting shoes comprising a body portion adapted to be grasped by one hand of an operator, a nozzle portion carried by one end of the body portion, a feed member mounted on the other end of the body portion for movement by the thumb of said hand of the operator to extrude adhesive through said nozzle portion onto the shoe being lasted, a retarder member mounted on said body portion for movement by the thumb of said hand of the operator to and from an operative position adjacent to the nozzle portion and an inoperative position away from said nozzle portion, and latch means for holding the retarder member in each of said two positions.

3. A tool for use in lasting shoes comprising a body portion adapted to be grasped by one hand of an operator and shaped to provide a passageway for receiving a quantity of solid thermoplastic adhesive, a nozzle portion carried by the body portion, said nozzle portion being shaped to provide a passageway through which the solid adhesive may be fed and being adapted to be heated to melt the adhesive as it is fed through said passageway, a feed member mounted on the body portion for movement by the operator thus to feed the solid adhesive through the passageway in said body portion and to extrude molten adhesive through said nozzle portion onto a shoe being lasted, and a retarder member mounted on said body portion for movement by the operator to and from an operative position adjacent to the nozzle portion and an inoperative position away from said nozzle portion.

4. A tool for use in lasting shoes comprising a body portion adapted to be grasped by one hand of an operator and shaped to provide a passageway for receiving a quantity of solid thermoplastic adhesive, a nozzle portion carried by one end of the body portion, said nozzle portion being shaped to provide a passageway through which the solid adhesive may be fed and being adapted to be heated to melt the adhesive as it is fed through said passageway, a feed member mounted on the other end of the body portion for movement by the thumb of said hand of the operator thus to feed the solid adhesive through the passageway in said body portion and to extrude molten adhesive through said nozzle portion onto the shoe being lasted, a retarder member mounted on said body portion for movement by the thumb of said hand of the operator to and from an operative position adjacent to the nozzle portion and an inoperative position away from said nozzle portion, and means for locking the feed member against movement when the retarder is in operative position.

5. A tool for use in lasting shoes comprising a body portion adapted to be grasped by one hand of an operator and shaped to provide a passageway for receiving a quantity of solid thermoplastic adhesive, a nozzle portion carried by the body portion, said nozzle portion being shaped to provide a passageway through which the solid adhesive may be fed and being adapted to be heated to melt the adhesive as it is fed through said passageway, a feed member mounted on the body portion for movement by the operator thus to feed the solid adhesive through the passageway in said body portion and to extrude molten adhesive through said nozzle portion onto the shoe being lasted, a retarder member mounted on said body portion for movement by the operator to and from an operative position adjacent to the nozzle portion and an inoperative position away from the nozzle portion, and latch means for holding the retarder member in each of said two positions.

6. A tool for use in lasting shoes comprising a body portion adapted to be grasped by one hand of an operator for receiving a quantity of solid thermoplastic adhesive, a nozzle portion carried by one end of the body portion, said nozzle portion being shaped to provide a passageway through which the solid adhesive may be fed and being adapted to be heated to melt the adhesive as it is fed through said passageway, a feed member mounted on the other end of the body portion for movement by the thumb of said hand of the operator thus to feed the solid adhesive through the passageway in said body portion and to extrude molten adhesive through said nozzle portion onto the shoe being lasted, a retarder member mounted on said body portion for movement by the thumb of said hand of the operator to and from an operative position adjacent to the nozzle portion and an inoperative position away from the nozzle portion, means for locking the feed member against movement when the retarder is in operative position, and latch means for holding the retarder member in each of said two positions.

7. A tool for use in lasting shoes comprising a body portion adapted to be grasped by one hand of an operator, a nozzle portion carried by the body portion, a feed member mounted on the body portion for movement by the operator to extrude adhesive through said nozzle portion onto the shoe being lasted, a retarder member mounted on said body portion for movement by the operator to and from an operative position adjacent to the nozzle portion and an inoperative position away from said nozzle portion, a valve member for controlling the flow of adhesive through said nozzle portion, and means for moving the valve member to closed position when the retarder is in operative position and to open position when the retarder is in inoperative position.

8. A tool for use in lasting shoes comprising a body portion adapted to be grasped by one hand of an operator, a nozzle portion carried by one end of the body portion, a feed member mounted on the other end of the body portion for movement by the thumb of said hand of the operator to extrude adhesive through said nozzle portion onto the shoe being lasted, a retarder member mounted on said body portion for movement by the thumb of said hand of the operator to and from an operative position adjacent to the nozzle portion and an inoperative position away from said nozzle portion, a valve member for controlling the flow of adhesive through said nozzle portion, means for moving the valve member to closed position when the retarder is in operative position and to open position when the retarder is in inoperative position, and latch means for holding the retarder member in each of said two positions.

9. A tool for use in lasting shoes comprising a body portion adapted to be grasped by one hand of an operator and shaped to provide a passageway for receiving a quantity of solid thermoplastic adhesive, a nozzle portion carried by the body portion, said nozzle portion being shaped to provide a passageway through which the solid adhesive may be fed and being adapted to be heated to melt the adhesive as it is fed through said passageway, a feed member mounted on the body portion for movement by the operator thus to feed the solid adhesive through the passageway in said body portion and to extrude molten adhesive through said nozzle portion onto a shoe being lasted, a retarder member mounted on said body portion for movement by the operator to and from an operative position adjacent to the nozzle portion and an inoperative position away from said nozzle portion, a valve member for controlling the flow of adhesive through said nozzle portion, and means for moving the valve member to closed position when the retarder is in operative position and to open position when the retarder is in inoperative position.

10. A tool for use in lasting shoes comprising a body portion adapted to be grasped by one hand of an operator and shaped to provide a passageway for receiving a quantity of solid thermoplastic adhesive, a nozzle portion carried by one end of the body portion, said nozzle portion being shaped to provide a passageway through which the solid adhesive may be fed and being adapted to be heated to melt the adhesive as it is fed through said passageway, a feed member mounted on the other end of the body portion for movement by the thumb of said hand of the operator thus to feed the solid adhesive through the passageway in said body portion and to extrude molten adhesive through said nozzle portion onto the shoe being lasted, a retarder member mounted on said body portion for movement by the thumb of said hand of the operator to and from an operative position adjacent to the nozzle portion and an inoperative position away from said nozzle portion, locking means for said feed member, a valve member for controlling the flow of adhesive through said nozzle portion, and means for engaging said locking means and for moving the valve member to closed position when the retarder is in operative position and for disengaging said locking means and for moving said valve member to open position when the retarder is in inoperative position.

11. A tool for use in lasting shoes comprising a body portion adapted to be grasped by one hand of an operator and shaped to provide a passageway for receiving a quantity of solid thermoplastic adhesive, a nozzle portion carried by the body portion, said nozzle portion being shaped to provide a passageway through which the solid adhesive may be fed and being adapted to be heated to melt the adhesive as it is fed through said passageway, a feed member mounted on the body portion for movement by the operator thus to feed the solid adhesive through the passageway in said body portion and to extrude molten adhesive through said nozzle portion onto the shoe being lasted, a retarder member mounted on said body portion for movement by the operator to and from an operative position adjacent to the nozzle portion and an inoperative position away from the nozzle portion, a valve member for controlling the flow of adhesive through said nozzle portion, means for moving the valve member to closed position when the retarder is in operative position and to open position when the retarder is in inoperative position, and latch means for holding the retarder member in each of said two positions.

12. A tool for use in lasting shoes comprising a body portion adapted to be grasped by one hand of an operator for receiving a quantity of solid thermoplastic adhesive, a nozzle portion carried by one end of the body portion, said nozzle portion being shaped to provide a passageway through which the solid adhesive may be fed and being adapted to be heated to melt the adhesive as it is fed through said passageway, a feed member mounted on the other end of the body portion for movement by the thumb of said hand of the operator thus to feed the solid adhesive through the passageway in said body portion and to extrude molten adhesive through said nozzle portion onto the shoe being lasted, a retarder member mounted on said body portion for movement by the thumb of said hand of the operator to and from an operative position adjacent to the nozzle portion and an inoperative position away from the nozzle portion, locking means for said feed member, a valve member for controlling the flow of adhesive through said nozzle portion, means for engaging said locking means and for moving the valve member to closed position when the retarder is in operative position and for disengaging said locking means for moving said valve member to open position when the retarder is in inoperative position, and latch means for holding the retarder member in each of said two positions.

13. Apparatus for use in the lasting of shoes comprising a tool having a body portion adapted to be grasped by one hand of an operator and a nozzle portion carried by the body portion and adapted to be heated, said nozzle portion being shaped to present two oppositely facing side surfaces, a stand for supporting said tool between periods of use, heat applying means adjacent to said stand having a pair of heat radiating members mounted for relative movement to engage the oppositely facing side surfaces of the nozzle portion of a tool supported on said stand, and cooperating means on said heat applying means and said tool for moving said members into engagement with the tool and for holding the heat radiating members and nozzle portion in heat transferring relation when the tool is supported on the stand.

14. Apparatus for use in the lasting of shoes comprising a tool having a body portion adapted to be grasped by one hand of an operator, a nozzle portion and a retarder carried by the body portion and adapted to be heated, said nozzle portion being shaped to present two oppositely facing side surfaces, a stand for supporting said tool between periods of use, heat applying means adjacent to said stand having a pair of heat radiating members adapted to engage the oppositely facing side surfaces of the nozzle portion, and a third heat radiating member for engaging the retarder of a tool supported on said stand, and cooperating means on said heat applying means and said tool for holding the heat applying means, nozzle portion and retarder in heat transferring relation when the tool is supported on the stand.

15. Apparatus for use in the lasting of shoes comprising a tool having a body portion adapted to be grasped by one hand of an operator and provided with a passageway for receiving a quantity of solid thermoplastic adhesive, a stand for supporting said tool between periods of use, and means adjacent to said stand for feeding solid thermoplastic adhesive into said passageway in a tool supported on said stand.

16. Apparatus for use in the lasting of shoes comprising a tool having a body portion adapted to be grasped by one hand of an operator and provided with a passageway for receiving a quantity of solid thermoplastic adhesive, a stand for supporting said tool between periods of use, manually operable means adjacent to the stand for feeding the leading end of an elongated strip of solid thermoplastic adhesive into said passageway in a tool supported on said stand, and manually operable means for thereafter severing said leading end of the strip within the passageway from the remaining portions of the strip.

17. Apparatus for use in lasting shoes comprising a tool having a body portion adapted to be grasped by the hand of an operator and provided with a nozzle portion and a passageway for receiving a quantity of solid thermoplastic adhesive, a stand for supporting the tool between periods of use, heat applying means adjacent to the stand for applying heat to the nozzle portion of a tool on the stand, and means adjacent to the stand for feeding solid thermoplastic adhesive into said passageway of a tool on the stand.

18. Apparatus for use in lasting shoes comprising a tool having a body portion adapted to be grasped by the hand of an operator and provided with a nozzle portion and a passageway for receiving a quantity of solid thermoplastic adhesive, a stand for supporting the tool between periods of use, heat applying means adjacent to the stand for applying heat to the nozzle portion of a tool on the stand, means adjacent to the stand for feeding solid thermoplastic adhesive into said passageway, and means for feeding the leading end of an elongated strip of solid thermoplastic adhesive into said passageway, and means for thereafter severing said leading end of the strip within the passageway from the remaining portion of the strip.

References Cited in the file of this patent

UNITED STATES PATENTS

| 1,264,174 | Furber | Apr. 30, 1918 |
| 1,516,970 | Kiger | Nov. 25, 1924 |

FOREIGN PATENTS

| 172,134 | Switzerland | Dec. 17, 1934 |